United States Patent [19]

Corser et al.

[11] Patent Number: 4,986,135

[45] Date of Patent: Jan. 22, 1991

[54] APPARATUS AND METHOD FOR MEASURING FLUID FLOW AND DENSITY

[75] Inventors: George A. Corser, Flint; Gary C. Hammond, Bancroft; Dale P. Eddy, Flint, all of Mich.

[73] Assignee: GMI Engineering & Management Institute, Flint, Mich.

[21] Appl. No.: 365,619

[22] Filed: Jun. 13, 1989

Related U.S. Application Data

[63] Continuation-in-part of Ser. No. 162,650, Mar. 1, 1988, Pat. No. 4,860,594.

[51] Int. Cl.$^5$ .............................................. G01F 1/20
[52] U.S. Cl. ............................. 73/861.42; 73/861.61; 73/861.72
[58] Field of Search ................ 73/861.42., 861.47, 73/861.52, 861.53, 861.61, 861.62, 861.71, 861.72

[56] References Cited

U.S. PATENT DOCUMENTS

2,800,794  7/1957  Meneghelli ..................... 73/861.72
2,811,855  11/1957  Kotas ............................. 73/861.72
2,897,672  8/1959  Glasbrenner et al. ........... 73/861.72
3,693,437  9/1972  Shiba ............................. 73/861.71

Primary Examiner—Herbert Goldstein
Attorney, Agent, or Firm—Brooks & Kushman

[57] ABSTRACT

The invention utilizes a conduit, having an input, an output, and a central region therebetween, in conjunction with a nozzle having an inlet, a restricted outlet and a thin-wall throughput region, to measure fluid flow. The nozzle inlet sealingly cooperates with the conduit, and the nozzle throughput region and restricted outlet project into the conduit central region, thereby allowing fluid in the conduit central region to surround the nozzle. The nozzle throughput region elastically deforms circumaxially and longitudinally proportional to varying fluid flow. Sensor means are provided to measure and evaluate the elastic deformation caused by fluid flow and to provide a pressure deformation signal from which fluid flow may be determined. The nozzle is interchangeable to allow nozzles of specified construction and characteristics to be utilized as needed.

27 Claims, 5 Drawing Sheets

APPARATUS AND METHOD FOR MEASURING FLUID FLOW AND DENSITY

Related Applications

This application is a continuation-in-part of U.S. Ser. No. 162,650, filed on Mar. 1, 1988, which is entitled Apparatus and Method for Measuring Mass Flow and Density now issued as U.S. Pat. No. 4,860,594 hereinafter referred to as the parent case, which is incorporated by reference herein.

FIELD OF INVENTION

This invention relates to an apparatus and methods of measuring fluid flow, and more particularly to flow measurement devices utilizing an elastically deformable nozzle.

BACKGROUND OF INVENTION

As described in the parent case, the measurement of the mass flow of a fluid, particularly fluids of varying unknown density, is a difficult task. This difficulty is greatly increased when the line pressure of the fluid is unknown and variable. Line pressure fluctuation is particularly troublesome in flow meters which utilize strain gages on a tube wall, such as those illustrated in U.S. Pat. No. 2,811,855. Line pressure variation of the fluid causes both the hoop stress and longitudinal stress at the tube wall to vary. Complex pressure correction algorithms become necessary in order to accurately compensate the perceived flow measurement for error resulting from line pressure effect.

Another problem frequently encountered in flow measurement is properly sizing the flow meter for a particular flow range likely to occur in a specific application. A flow meter design for very low flows would typically cause very high flow restriction if operated at high flow. On the other hand, a flow meter with a very high maximum flow capability would tend to be very inaccurate when used at flow levels dramatically less than the maximum rated capacity. This useful range is sometimes expressed in terms of turndown ratio. A flow meter with a maximum rated capacity of a 1000 pounds per minute having a turndown ratio of 10 could be used to measure flows in the 100 to 1000 pound per minute range. To measure more than or less than the designed flow rates, an alternative flow meter must be utilized.

OBJECTS, FEATURES AND ADVANTAGES OF INVENTION

An object of the present invention is to develop a fluid flow meter having an elastic flow sensing element that is not a load-carrying outer member of the meter.

Another object of the present invention is to provide a fluid flow meter that can be constructed with a very thin-walled nozzle, which does not need to withstand fluid static pressure.

Yet another object of the present invention is to provide a fluid flow meter capable of measuring strain outputs where the measured fluid has low flow rate and providing high flow sensation for a wide range of line pressures.

Another object of the present invention is to provide a fluid flow meter having a better turndown ratio for a given accuracy and pressure drop specification.

Yet another object of the present invention is to provide a fluid flow meter that is less sensitive to pump vibrations or in-line pressure surges than previous meters.

Another object of the present invention is to provide a fluid flow meter capable of measuring fluid flow with only one Wheatstone bridge.

Yet another object of the present invention is to provide a fluid flow meter that is easier and less expensive to fabricate than previous meters.

Another object of the present invention is to develop a fluid flow meter of compact design.

Yet another object of the present invention is to provide a fluid flow meter that is compatible with varying input and output orientations.

Another object of the present invention is to develop a fluid flow meter that can be equipped with interchangeable sensing elements suitable for differing flow rates or fluids, and for calibration checks.

Yet another object of the present invention is to provide a fluid flow meter whose sensing element may be interchangeably replaced in the field without removing the meter from the line.

Another object of the present invention is to develop a fluid flow meter whose sensing element can be interchangeably replaced with sensing elements capable of operating in high temperature or corrosive applications.

These and other objects, features, and advantages of the present invention will be apparent from the review of the accompanying description of the preferred embodiment.

SUMMARY OF INVENTION

The invention is an improved meter to measure fluid flow. It utilizes a conduit having an input, an output, and a central region for fluid flow therebetween, in conjunction with a nozzle, having an inlet, a restricted outlet and a thin-wall throughput region. The nozzle inlet sealingly cooperates with the conduit, and the nozzle throughput region and restricted outlet project into the conduit central region, thereby allowing fluid in the conduit central region to surround the nozzle entirely therein. The nozzle throughput region elastically deforms circumaxially and longitudinally proportional to varying fluid flow. Sensor means are also provided to measure and evaluate the elastic deformation caused by fluid flow and to provide a pressure deformation signal from which fluid flow may be determined. The nozzle is interchangeable to allow nozzles of specified construction and characteristics to be utilized as needed. Alternative embodiments of the invention include means to measure the elastic deformation of the conduit to determine fluid density so that fluid mass flow may be determined when pressure and density are unknown.

BRIEF DESCRIPTION OF PREFERRED EMBODIMENT

Figure 1:
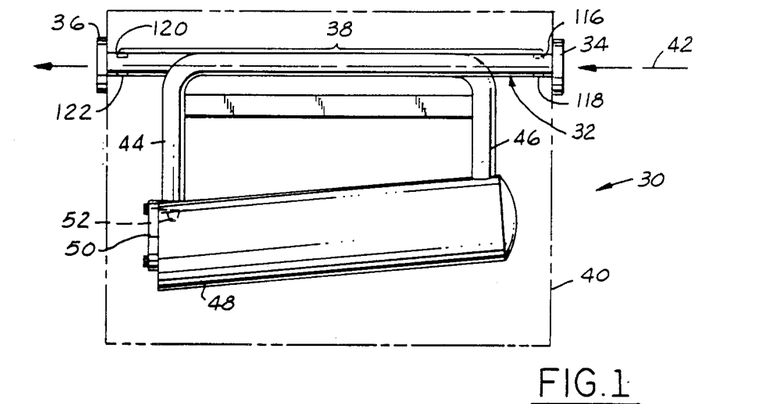
FIG. 1 is a front view of a preferred flow meter embodiment.
Figure 2:
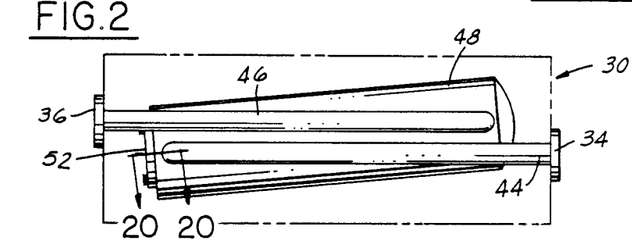
FIG. 2 is a top view of a preferred flow meter embodiment.

FIGS. 1 and 2 show a first embodiment of flow meter made in accordance with the present invention. Flow meter 30 includes a conduit 32, which, in turn, includes an input 34, an output 36, and a central region 38 therebetween. Preferably, conduit 32 is contained within a housing 40, which is shown in phantom outline for illustration purposes. The conduit input 34 and an output 36 are attached to housing 40, with central region 38 is freely suspended therebetween.

Flow meter 30, shown in FIGS. 1 and 2, is designed to be mounted horizontally with input 34 and output 36 aligned in side elevation parallel to one another and horizontal axis 42. Conduit central region 38 is comprised of a pair of small diameter L-shaped tubes 44 and 46 which connect input 34 and output 36 to enlarged reservoir 48. Reservoir 48 has a cross-sectional area which is significantly greater than the conduit input 34 and output 36 and L-shaped tubes 44 and 46. Reservoir 48 provides a region of slower moving fluid, as well as providing a large fixed volume of fluid which can be weighed in order to determine fluid density. Nozzle retainer 50 is removably attachable from reservoir 48 for positioning nozzle 52 in cooperation with tube 44.

Figure 20:
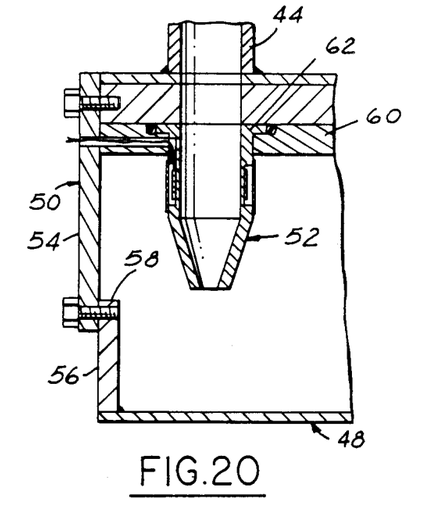
FIG. 20 is an enlarged cross-sectional side view of a preferred embodiment taken along line 20—20, as shown in FIG., 2.

The orientation of the nozzle and the nozzle retainer plate relative to reservoir 48 is shown in detail in FIG. 20. Nozzle retainer 50 includes a mounting flange 54 for removable attachment for reservoir end plate 56. The reservoir 48 is provided with an access hole 58 through which nozzle retainer horizontal portion 60 projects. The nozzle retainer horizontal portion 60 has a stepped hole formed therethrough for receiving nozzle 52. Nozzle 52 is provided with a circumferential mounting ring 62 which engages the stepped hole in the nozzle retainer horizontal portion 60. Nozzle 52 is cantileveredly supported from nozzle retainer horizontal portion 60 projecting into the interior of reservoir 48, as shown in FIG. 20.

A preferred nozzle 52 shown in FIG. 20 is formed of a corrosion resistant metal, such as stainless steel or the like. Alternatively, the nozzle can be formed of a ceramic material, as illustrated by nozzle 64 shown in enlarged cross-section in FIG. 21. FIG. 22 is an enlarged cross-sectional side view of the metal nozzle 52 shown in FIG. 20. The nozzles 52 and 64 are generally similar in shape having inlets 66 and 68 and outlets 70 and 72 respectively. Both nozzles 52 and 64 are provided with a thin wall throughput region 74 and 76 oriented between their respected inlets and outlets. In the preferred embodiments shown, the gradually tapered section is formed downstream of the thin wall throughput regions 78 and 80, gradually changing the nozzle diameter from the inlet diameter 66 and 68 to the outlet diameter 70 and 72.

As fluid flows through the nozzle into the interior reservoir 48, the velocity of the fluid increases directly proportional to the effective flow area of the nozzle. The change in the velocity causes the fluid momentum to change, thereby exerting mechanical loads upon the nozzle. As the nozzle is loaded, the thin walled throughput regions 74 and 76 elastically deform both circumaxially and longitudinally proportional to the flow of the fluid through the meter. It is important to note that the pressure differential between the liquid within the nozzle and the remainder of the reservoir interior is very slight and is a function of flow rate. At zero flow the pressure within the nozzle and the remainder of the reservoir will be the same. As flow increases the pressure differential proportional to the momentum change of the fluid increases. The thin wall throughput region can become very thin, unlike the nozzle section in the parent application which needed to be strong enough to withstand the static pressures of the fluid to be measured. As a result of this nozzle design, flow can be adequately determined by measuring the stress on the throughput region without static pressure correction.

Figure 21:
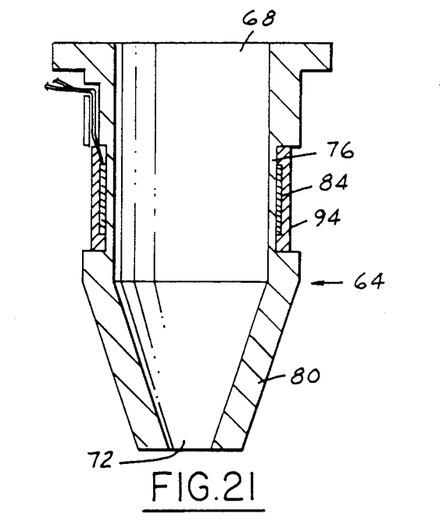
FIG. 21 is an alternative embodiment of the nozzle showing the use of a ceramic nozzle with semiconductor strain gages.
Figure 22:
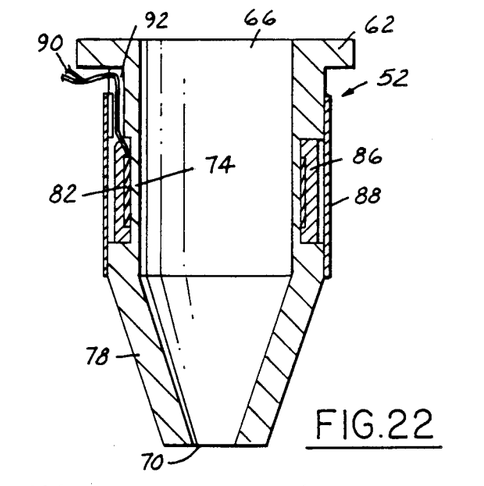
FIG. 22 is an enlarged section of the nozzle of FIG. 20.

The preferred nozzle geometric configuration is shown in FIGS. 21 and 22. In the metal nozzle 52, shown in FIG. 22, the central region of the nozzle has been machined down to form the thin walled throughput region 74. In metallic nozzle 52, foil strain gages 82 are bonded to the thin walled throughput region 74 periphery. In the ceramic nozzle 64 shown in FIG. 21, the semiconductor strain gages 84 are bonded to the periphery of the thin walled throughput region 76. In order to isolate the gages from the fluid whose flow is being measured, the gages must be carefully coated with a sealant 86.

Figure 23:
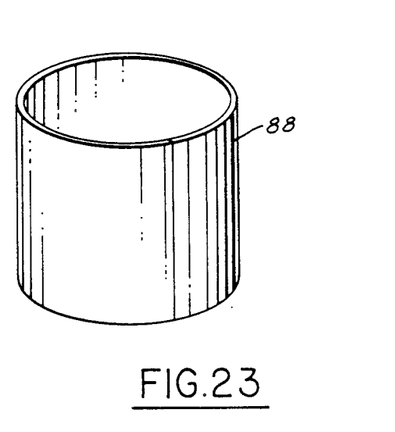
FIG. 23 is a perspective view of the sheath shown in FIG. 22.

In the metallic embodiment of the nozzle 52 shown in FIG. 22, foil strain gages 82 are bonded to the thin walled throughput 74 periphery and coated with a protective layer of silicone or the like. Then, a very thin wall tubular sleeve 88, shown in FIGS. 22 and 23, will be placed over throughput region 74 and welded in place. Ideally, the thickness of the sleeve 88 will be significantly less than the thickness of the thin walled throughput region 74 so that the throughput region will carry the majority of the loads exerted on nozzle 52. In order to protect lead wires 90 from exposure to the fluid, the wires are routed from the strain gages through the nozzle mounting flange 62 via an internal port 92 extending within the nozzle from the region of flange 62 to the volume bounded by the thin wall throughput region 74 and sleeve 88.

In the preferred embodiment of the metal nozzle shown, nozzle 52 is formed of stainless steel 316L having a thin wall throughput of thickness 0.008". Inlet 66 has a diameter of 1.375 inches and outlet 70 has a diameter of 0.500 inches. Sleeve 88 is formed of stainless steel 316L having a thickness of 0.002. Foil strain gages are bonded using conventional adhesive, the sealant such as silicone or the like is applied to isolate the gages from the surrounding fluid for testing prior to installation of the sleeve. The silicone should completely fill the volume bounded by the thin wall throughput regions 74 and sleeve 88 so the nozzle will be incompressible when subject to static fluid pressure. Preferably, four gages are noted along the throughput region periphery alternatively oriented longitudinally and circumaxially. The nozzle of the structure described was tested without the sleeve and works quite satisfactorily to measure the flow of water in the 100 to 500 pounds per minute flow range. It should be appreciated that if higher or lower flow rates are desired to be measured, the nozzle can be scaled upward or downward accordingly.

The ceramic nozzle 64 shown in FIG. 21 is very similar in construction to metallic nozzle 52, however, semiconductor gages 84 are bonded to the thin wall throughput region 76 using a ceramic adhesive. Preferably, the gages are then coated with a ceramic cement 94 or the like. The preferred material for nozzle fabrication is ceramic having a thermal coefficient of expansion matching that of the semiconductor gages and having zero porosity. In designing a ceramic nozzle, the thin wall throughput region 76 may be considerably thicker than a metal nozzle having a similar diameter and rate of flow capacity, due to the increased sensitivity of the semiconductor gages and the difference in modulus of elasticity.

The utilization of a nozzle of the present design, which is cantileveredly supported and suspended within the fluid contained in the reservoir 48, has a number of significant advantages. The nozzle is not a load carrying member, and is not affected by fluid static pressure. This enables the thin wall throughput region to be made very thin and highly sensitive.

Other advantages achieved through the use of nozzles of the present design are: larger turndown ratios for a given tolerance specification; less sensitivity to pressure fluctuations and line surges; a damping effect due to the merging in the reservoir; ease of nozzle fabrication; and the compactness of a design. Additionally, the present nozzle enables mass flow to be determined using a single Wheatstone bridge since the nozzle is unaffected by static pressure variation. This allows the electronic circuitry to be simplified significantly. Finally, the use of the nozzle of the present design enables the nozzles to be changed as desired in order to accommodate a very wide range of flow rates as well as highly corrosive fluids.

Figure 3:
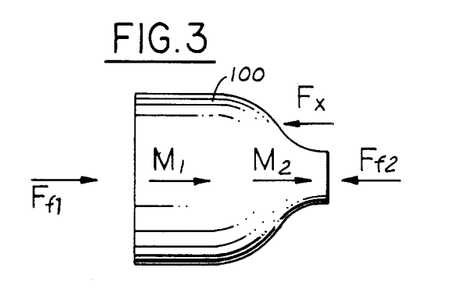
FIG. 3 is a control volume of fluid contained in the nozzle.
Figure 4:
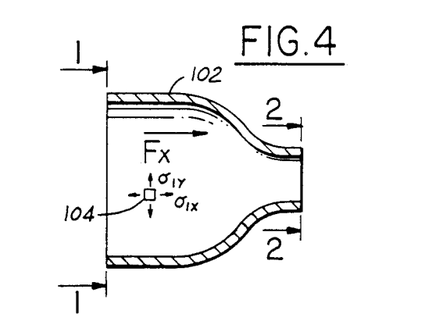
FIG. 4 is a free body diagram of the nozzle.

FIG. 3 shows a control volume of fluid 100 contained in a tapered tube such as nozzle 102 of FIG. 4. Vector $F_x$ represents the interacting force between the fluid and the tube. This interacting force $F_x$ is the sum of the x components of the pressure forces and changes of momentum flux acting through the tapered section. $F_{f1}$ is the fluid pressure at section 1—1. $F_{f2}$ is the fluid pressure at section 2—2. $M_1$ is the momentum flux at section 1—1 and $M_2$ is the momentum flux at section 2—2.

FIG. 4 is a free body diagram of a nozzle 102. FIG. 4 includes a sub-figure illustrating the stresses on imaginary element 104. Stresses in the tube wall at element 104 can be analyzed using principles of static for a biaxial stress condition with zero shear. Flow through the tapered tube can then be analyzed as a classic nozzle using fundamental laws of flow for a classical fluid taking into consideration momentum flux, energy flux, mass flux, and system pressure variations.

Referring to FIG. 3, the force and momentum equations for the fluid can be written as follows; where subscript f refers to the fluid:

$$F_{f1} = P_1 A_{f1}$$
$$F_{f2} = P_2 A_{f2}$$
$$F_x = \int (PdA)_x$$
$$M_1 = \rho Q v_1$$
$$M_2 = \rho Q v_2$$

Where:
$F_{f1}$ = Fluid pressure force at section 1-1
$F_{f2}$ = Fluid pressure force at section 2—2
$P_1$ = Average pressure at section 1-1
$P_2$ = Average pressure at section 2—2
$A_{f1}$ = Fluid flow area at section 1-1
$A_{f2}$ = Fluid flow area at section 2—2
$F_x$ = The sum of the x-directed pressure forces between sections 1-1 and 2—2
$M_1$ = Momentum flux at section 1-1
$M_2$ = Momentum flux at section 2—2
$\rho$ = Fluid density (assumed constant control volume)
Q = volumetric flow rate
$V_1$ = Average velocity at section 1-1
$V_2$ = Average velocity at section 2—2

Application of the momentum principle for FIG. 3 gives:

$$\Sigma F = \Sigma M$$
$$F_{f1} - F_x - F_{f2} = -\rho Q V_1 + \rho Q V_2$$

$$F_x = F_{f1} - F_{f2} + \rho Q V_1 - \rho Q V_2$$

or $$F_x = P_1 A_{f1} - P_2 A_{f2} + \rho Q V_1 - \rho Q V_2 \qquad \text{Eq. 1}$$

Application of the energy principle for FIG. 3, neglecting losses, gives:

$$P_1 + \rho(v_1^2/2) = P_2 + \rho(v_2^2/2) \quad \text{Eq. 2}$$

or $$P_2 = P_1 + (\rho/2)(V_1^2 - V_2^2) \quad \text{Eq. 3}$$

Application of the continuity principle for FIG. 3 gives:

$$Q = V_1 A_{f1} = V_2 A_{f2} \quad \text{Eq. 4}$$

or $$V_1 = Q/A_{f1} \text{ and } V_2 = Q/A_{f2} \quad \text{Eq. 5}$$

Referring to FIG. 4, the force equations for the flow sensing element can be written as follows, where subscript s refers to the sensing element:

$$F_{s1} = \sigma_{1x} A_{s1} \quad \text{Eq. 6}$$

$$F_x = \int (PdA)_x \quad \text{Eq. 7}$$

$$F_2 = P_2(A_o - A_{f2}) \approx P_2(a_{f1} - A_{f2}) \quad \text{Eq. 8}$$

Where:
- $F_{s1}$ = The axial force in the sensing element at section 1-13 1.
- $F_x$ = The sum of the x directed pressure forces between sections 1-13 1 and 2—2.
- $F_2$ = The axial force on the sensing element at the stagnation region.
- $\sigma_{1x}$ = The axial stress in the sensing element at section 1-13 1.
- $A_{s1}$ = The cross-sectional area of the sensing element at section 1-13 1.
- $A_o$ = The projected area of the sensing element at section 1—1 = $A_{f1} + A_{s1} \approx A_{f1}$ for thin wall sections.
- $D_1$ = The diameter of the tube at section 1—1.
- $T_1$ = The thickness of the tube at section 1—1.

Application of the equilibrium equation to the free body diagram of FIG. 4 gives:

$$-F_{s1} + F_x = F_2 = 0$$

$$F_x = F_{s1} + F_2 \quad \text{Eq. 9}$$

Substituting Equations 6 and 8 into Equation 9 gives:

$$F_x = \sigma_{1x} A_{s1} + P_2(A_{f1} - A_{f2}) \quad \text{Eq. 10}$$

Equating Equations 1 and 10 gives:

$$P_1 A_{f1} - P_2 A_{f2} + \rho Q V_1 - \rho Q V_2$$
$$= \sigma_{1x} A_{s1} + P_2 A_{f1} - P_2 A_{f2}$$

or $$\sigma_{1x} A_{s1} = (P_1 - P_2) A_{f1} + \rho Q V_1 - \rho Q V_2 \quad \text{Eq. 11}$$

Substituting Equations 3 and 5 into Equation 11 gives:

$$\sigma_{x1} A_{s1} = [(-A_{f1}/2)(1/A^2_{f2}) + (1/A_{f1} - 1/A_{f2})]\rho Q^2 \quad \text{Eq. 12}$$

Re-writing Equation 12 where $A_{f1} A_{s1} = D_1/4T_1$ gives:

$$\sigma_{x1} A_{s1} = [(-A_{f1}/2)(1/A_{f1}^2 - 1/A_{f2}^2) + (1/A_{f1} - 1/A_{f2})]\rho A^2 \quad \text{Eq. 12}$$

or $$\sigma_{1x} = K_A \rho Q^2 \quad \text{Eq. 13b}$$

Where $$K_A = [(-D_1/8T_1)(1/A_{f1}^2 - 1/A_{f2}^2) + (1/s_1)(1/A_{f1} - 1/A_{f2})] \quad \text{Eq. 14}$$

From thin walled pressure vessel theory, the transverse (hoop) stress, $\sigma_{1y}$ is:

$$\sigma_{1y} = P_1 D_1/2T_1 - P_2 D_1/2t_1 \quad \text{Eq. 15a}$$

or $$\sigma_{1y} = (P_1 - P_2)D_1/2T_1 \quad \text{Eq. 15b}$$

Substituting Equations 3 and 5 into Equation 15b gives:

$$\sigma_{1y} = -(D_1/4T_1)(1/A_{f1}^2 - 1/A_{f2}^2)\rho Q^2 \quad \text{Eq. 16a}$$

or $$\sigma_{16} = -K_B \rho Q^2 \quad \text{Eq. 16b}$$

where $$K_B = (D_1/4T_1)(1/A_{f1}^2 - 1/A_{f2}^2) \quad \text{Eq. 17}$$

The bi-axial relationships between stress and strain are:

$$\epsilon_{1x} = (1/E)(\sigma_{1x} - \mu\sigma_{1y}) \quad \text{Eq. 18}$$

$$\epsilon_{1y} = (1/E)(\sigma_{1y} - \mu\sigma_{1x}) \quad \text{Eq. 19}$$

Where:
- $\epsilon_{1x}$ = Strain in the axial direction of the sensing element at section 1-13 1.
- $\epsilon_{1y}$ = Strain in the transverse direction of the sensing element at section 1-13 1.
- E = Modulus of elasticity.
- $\mu$ Poisson's ratio.

Figure 5:
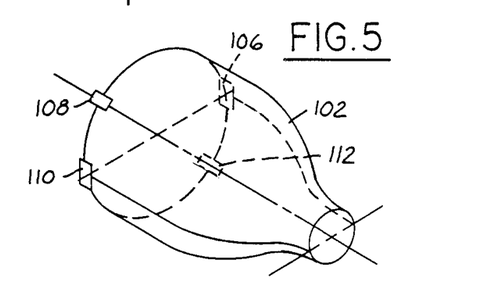
FIG. 5 is a perspective diagram of a segment of the nozzle showing the preferred orientation and location of strain gages.
Figure 6:
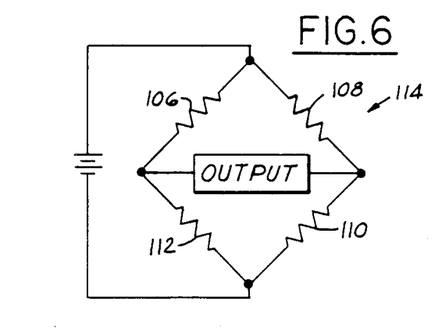
FIG. 6 is a strain gage bridge formed of gages mounted in accordance with the gage orientation shown in FIG. 5.

The preferred flow bridge configuration is shown in FIGS. 4 and 5. FIG. 5 is a perspective view of nozzle 102 shown in FIG. 4 illustrating the location and orientation of strain gages 106, 108, 110 and 112. Gages 106 and 110 measure hoop or circumaxial stresses, While gages 108 and 112 measure longitudinal stresses. Bridge 114 is a standard Wheatstone bridge with the hoop gages oriented in opposite arms, and the longitudinal gages oriented in opposite arms as shown in FIG. 6.

The output of bridge 114 is given by:

$$B.O. = 2(\epsilon_{1x} - \epsilon_{1y}) \quad \text{Eq. 20}$$

Substituting Equations 13b and 16b into Equations 18 and 19 gives expressions for $\epsilon_{1x}$ and $\epsilon_{1y}$. Substituting these expressions into Equation 20 gives:

$$B.O. = 2[(1+\mu)/E][K_A + K_B](\rho A^2) \quad \text{Eq. 21}$$

Substituting Equations 14 and 17 into Equation 21 gives:

$$B.O. = 2[(1+\mu)/E][(D_1/8T_1)(1/A_{f1}^2 - 1/A_{f2}^2) + (1/A_{s1})(1/A_{f1} - 1/A_{f2})](\rho Q^2) \quad \text{Eq. 22}$$

From Equation 22 it is evident that the bridge output (B.O.) is a function of the geometric configuration and material properties of gages 106, 108, 110 and 112, along with the flow rate, Q, for a given density. From the measured bridge output, flow rate can be determined.

From Equations 21 or 22 it is clear that:

$$\epsilon_{BO} = \rho K Q^2 \qquad \text{Eq. 23}$$

Where
$\epsilon_{BO}$ is the bridge output in $\mu\epsilon$,
K is a constant determined by material properties and geometric arrangement of gages 106, 108, 110 and 112
$\rho$ is the fluid density, and
Q is the volumetric flow rate.

As described in great detail in the parent application, the flow meter of the present design is capable of determining the density of an unknown fluid. The present invention utilizes strain gages 116, 118, 120 and 122 mounted on tubes 44 and 46 adjacent to the input and the output to determine the weight of the fluid contained within reservoir 48. The weight of the fluid in the reservoir will cause a bending moment, inducing a strain on the tube wall. Two of the gages will be loaded in tension and two will be loaded in compression. The gages are interconnected to form a Wheatstone bridge 124, as shown in FIG. 7, in a conventional manner and provide a density input to the microprocessor.

Figure 7:
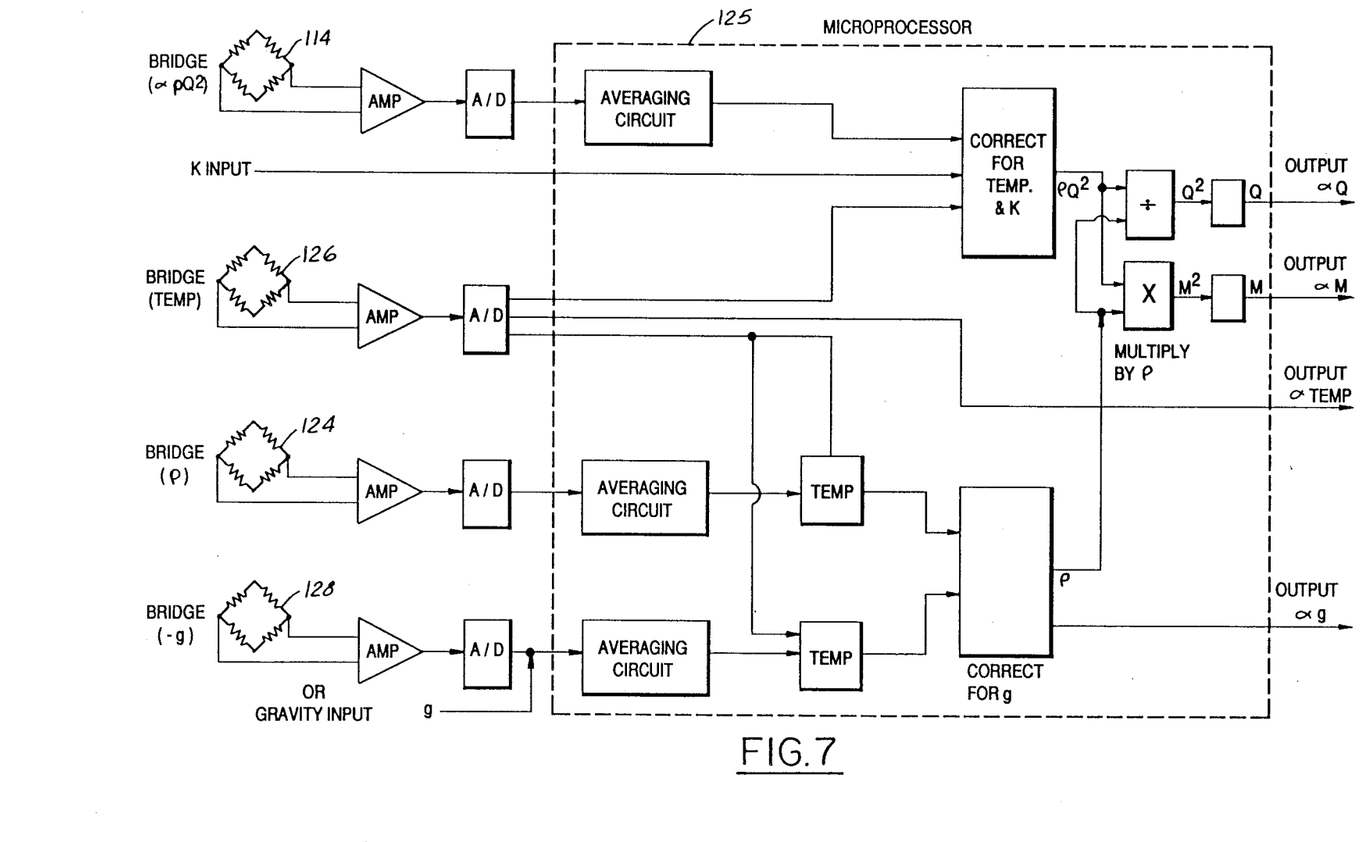
FIG. 7 is a block diagram showing a representative electrical circuit to output fluid mass flow, volumetric flow, pressure, temperature and density.
Figure 7A:
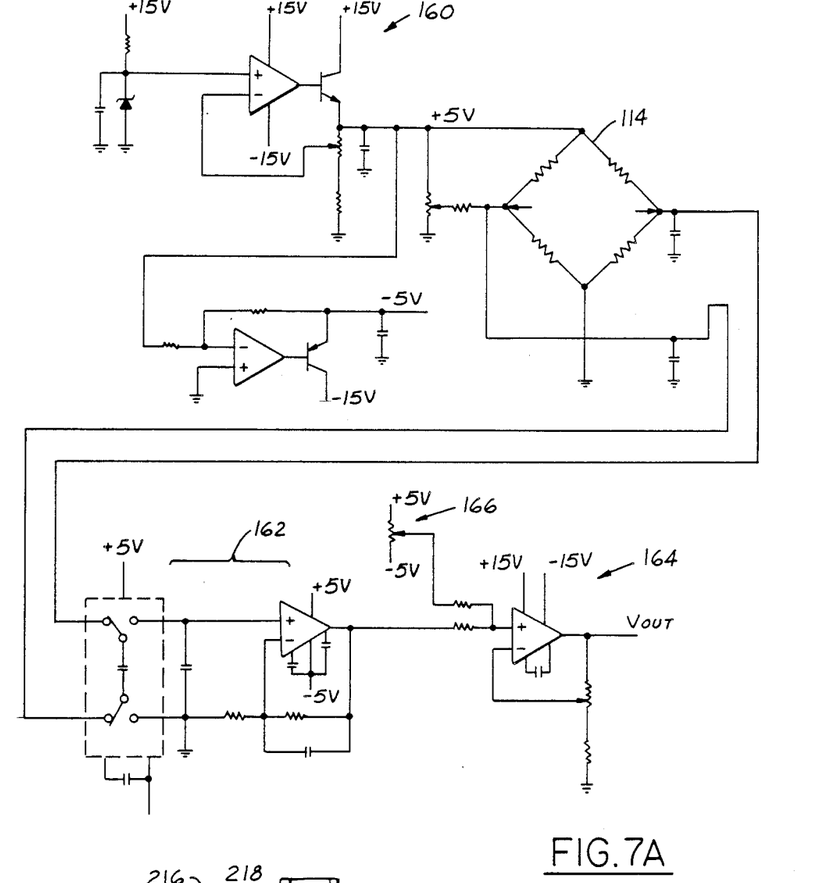
FIG. 7a is an electrical schematic diagram of a strain gage power supply and signal amplifier circuit.

FIG. 7a shows a preferred power supply and amplifier circuit utilized and carrying out the best mode of the present invention. In order to obtain the most accurate flow measurements it is desirable to minimize the noise and develop the cleanest strain signal possible prior to making the analog-to-digital conversion. A very stable viable input is provided by power supply 160 to a strain gage bridge 114. The output of the strain gage is then amplified by a chopper-stabilized operational amplifier 162. The output of the chopper-stabilized operational amplifier 162 is then further amplified by operational amplifier 164. Amplifiers 162 and 164 are commercially available from Linear Technology Corporation, having product numbers LTC1052 and LM308, respectively. The amplifier circuit allowed very high gains to be achieved. The circuit shown allows gains of 1000 to 11,000 to be obtained. Whenever gains of this magnitude are achieved, it becomes very important to zero the amplifiers. The +5 volt and -5 volt signals from the power supply 160 are provided to zeroing pot 166 which enables amplifier 164 to be precisely zeroed. It should be appreciated that any one of a number of accurate amplifier circuits could be used, the present circuit is disclosed merely for the purposes of illustrating the best mode of practicing the invention.

Microprocessor 125 shown in FIG. 7 has a number of inputs. Wheatstone bridge 114 which was shown and described relative to FIG. 6, provides an input which is a function of $\rho Q^2$. A temperature bridge 126 will provide a temperature input necessary to correct perceived stress due to differences in coefficients of expansion between strain gages and their supporting substrates. Gravity bridge 128 or alternatively a gravity input may be optionally provided where gravitational constant variation correction is desired. To facilitate nozzle charges, an input for flow constant K may also be provided. Given these inputs, mass flow, and volumetric flow may be calculated by solving the flow equations previously described. The microprocessor may also provide gravity and temperature outputs as shown in FIG. 7.

As shown in FIG. 7, each of the various inputs are analog. The analog inputs are first amplified and then passed through an analog-to-digital converter as indicated. Preferably, the microprocessor will average the input signals over a specified time interval in order to eliminate noise and high frequency fluctuations. The average signals are then corrected for temperature effect and processed.

The flow bridge input is then processed to yield a term which is a function of $\rho Q^2$. The density and gravity inputs are solved to determine fluid density. The $\rho Q^2$ term can then be divided by $\rho$ and ultimately Q readily determined. Similarly, the $\rho Q^2$ term can be multiplied by $\rho$ and mass flow rate readily determined.

Second Alternative Embodiment

Figures 8, 10:
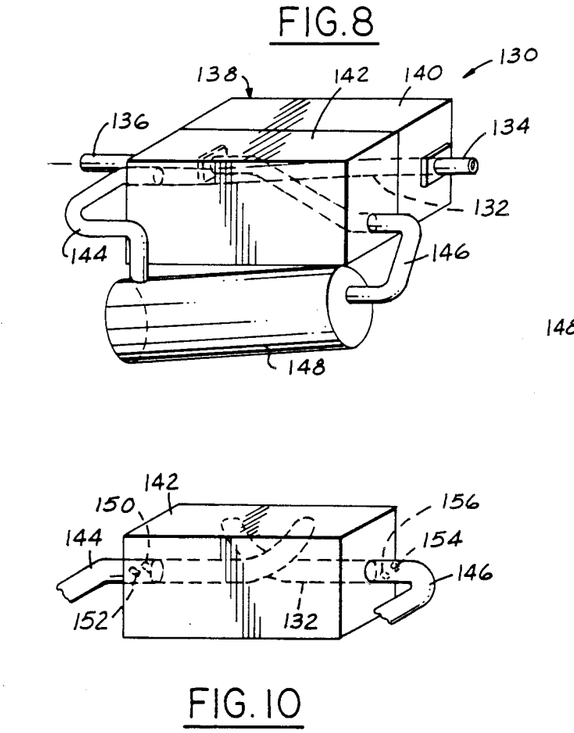
FIG. 8 is a perspective view of an alternative flow meter embodiment.
FIG. 10 is an expanded perspective view of a portion of the preferred flow meter embodiment shown in FIG. 8.
Figure 9:
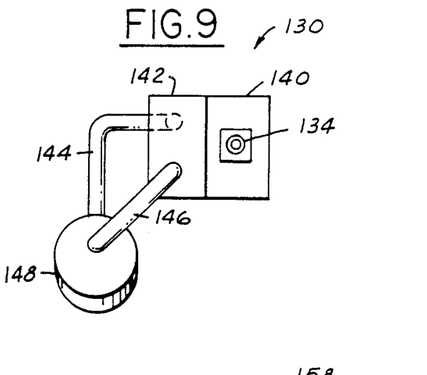
FIG. 9 is a side view of the preferred flow meter shown in FIG. 8.

A second flow meter embodiment 130 is shown in FIG. 8. This flow meter functions on a similar flow theory as the flow meter first embodiment 30, shown in FIGS. 1 and 2, however, the device is different mechanically. Flow meter 130 has an internal conduit 132 extending between input 134 and output 136. In order to prevent mechanical loads which are exerted on the input and output from damaging the flow meter or effecting flow measurement accuracy, a portion of conduit 132 which extends between the input and output is integrally formed in a heavy block.

In the preferred embodiment shown in FIG. 8, block 138 is made up of two pieces, in-line block 140 and meter block 142. The in-line block and the meter block are connected together using conventional fasteners not shown to define internal fluid flow passageways which make up a part of the conduit extending between the input 134 and output 136. The internal passageways are shown in phantom outline in FIGS. 8 and 10. The internal passageways extend generally diagonally across the block and are seemingly coupled to tubes 144 and 146. Tubes 144 and 146 are suspended from meter block 142 at one end and connected to reservoir 148 at the other end. Tube 144 is coupled to a nozzle cantileveredly supported from the reservoir wall and projecting cantileveredly into the fluid within the reservoir in a manner similar to flow meter 30 described previously.

Figure 11:
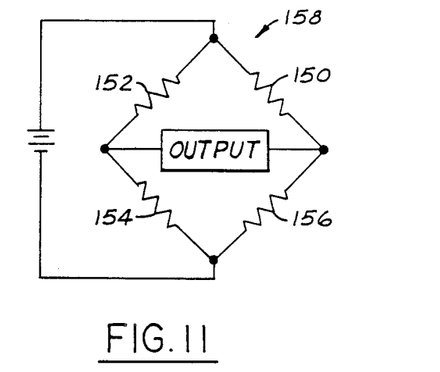
FIG. 11 is a strain gage bridge formed of gages mounted in accordance with the gage orientation shown in FIG. 10.

Strain gages 150 and 152 are affixed to tube 144 and strain gages 154 and 156 are affixed to tube 146 oriented diagonally, as shown in FIG. 10, to monitor the torsional stress exerted on the tubes as a result of the weight of the fluid contained within reservoir 148. Strain gages 150, 152, 154 and 156 are interconnected to form a Wheatstone bridge 158, as shown in FIG. 11. In this second embodiment of the invention, Wheatstone bridge 158 will perform the same function as density bridge 124, shown in FIG. 7, in the first embodiment.

Flow meter 130 is suitable for use in situations were very high mechanical loads will be exerted upon the flow meter. Examples of such situations will be industrial plants, such as oil refineries and the like where long runs of heavy tubing are used to carry pressurized fluid. Mechanical expansion and contraction caused by heating and cooling the conduit causes a very high axial compressive and tensile load being exerted on the flow meter. The in-line block 140 acts to transfer the loads between the input and output where the connecting pipes would be bolted to mounting flanges isolating the elastic elements which will be deflected as a function of flow or mass. For industrial applications, in-line block 140 and meter block 142 may be formed of steel castings, preferably stainless steel or other highly corrosion resistant material.

In order to enable meter 130 to be installed in a variety of industrial applications were the input and output pipe may not be horizontal and coaxial, block 138 is formed of two pieces, in-line block 140 and meter block 142. In order accommodate a wide variety of desired input and output orientations without totally redesigning or purchasing an entire meter, in-line block 140 can be replaced with a number of alternative in-line block designs, as illustrated in FIGS. 12-19.

Figure 12:
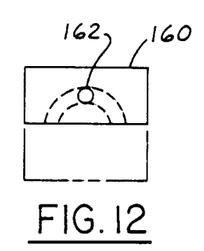
FIG. 12 is a top view of a preferred flow meter embodiment showing the use of an in-line block to transmit in-line force between the conduit input and the conduit output in an application involving vertical in-line conduit input and output orientation.
Figure 13:
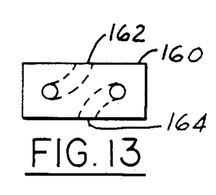
FIG. 13 is a front view of the preferred flow meter embodiment shown in FIG. 12.
Figure 14:
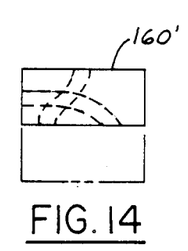
FIG. 14 is a top view of a preferred flow meter embodiment showing use of an in-line block to transmit in-line force between the conduit input and the conduit output in an application involving right angle conduit input and output orientation.
Figure 15:
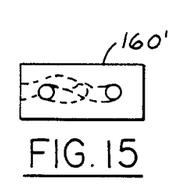
FIG. 15 is a front view of the preferred fluid flow meter embodiment shown in FIG. 14.
Figure 16:
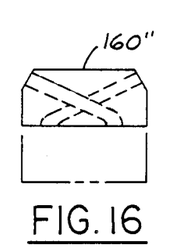
FIG. 16 is a top view of a preferred flow meter embodiment showing the use an in-line block to transmit in-line force between the conduit input and the conduit output in an application involving conduit input and output, to the meter at an angle.
Figure 17:
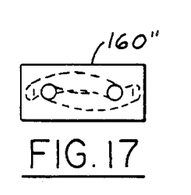
FIG. 17 is a front view of the preferred flow meter embodiment shown in FIG. 16.
Figure 18:
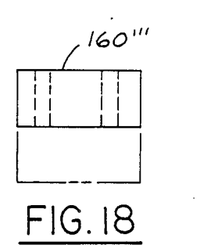
FIG. 18 is a top view of a preferred flow meter embodiment showing the use of an in-line block to transmit in-line force between the conduit input and the conduit output in an application involving parallel conduit input and output orientation.
Figure 19:
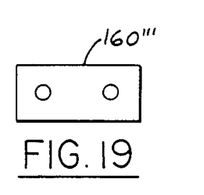
FIG. 19 is a front view of the preferred embodiment shown in FIG. 18.

FIGS. 12 and 13 illustrate an in-line block 160 having an input 162 and an output 164 lined along a vertical axis. In-line block 160 may be coupled to meter block 142 with the internal passageways formed therein aligned and sealingly cooperating with one another. FIGS. 14 and 15, 16 and 17, and 18 and 19 show various alternative in-line blocks 160', 160'' and 160'''. As illustrated by FIGS. 12-19, a wide variety of input and output orientations can be achieved using alternative in-line blocks while supporting the meter block and the remainder of the meter therefrom, substantially isolated from mechanical loads.

Third Alternative Embodiment

Figure 24:
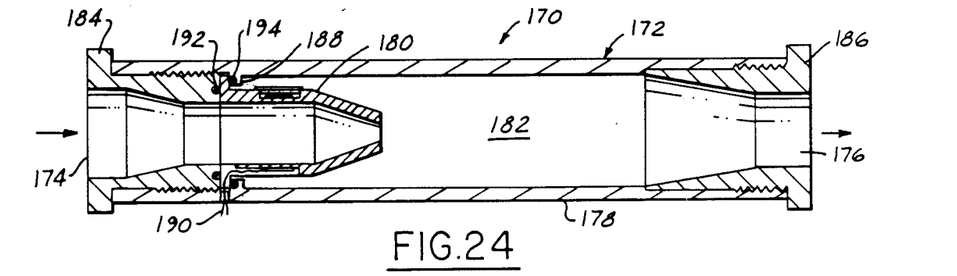
FIG. 24 is an alternative embodiment of the invention showing the use of an "in-line" nozzle.

Flow meter 170, shown in FIG. 24, illustrates an alternative embodiment of the invention. The flow meter is formed of a conduit 172 having an input 174 and output 176, and a central region 178 extending generally therebetween. Flow meter 170 is a straight through axial flow device. Nozzle 180 is structurally equivalent to nozzle 52 shown in FIG. 22, however, the nozzle is oriented differently. The conduit central region 178 has a relatively large diameter compared to that of input and output 174 and 176, providing a central reservoir 182. Mounted in the ends of conduit 178 is input coupling 184 and output coupling 186. Input coupling 184 is provided with threads on its outer periphery which engage corresponding internal threads within conduit 172. Output coupling 186 similarly threads into the opposite and of conduit 172. The input and output couplings are provided with peripheral flanges which provide means for attaching the flow meter to a fluid carrying conduit.

Input coupling 184 also serves to retain nozzle 180 sealingly engaged against annular seat formed in conduit 172. The input coupling 184 can be removed so the nozzle 180 can be replaced as necessary. The wires extending from the nozzle strain gages extend out of a port 190 formed in the conduit wall and are sealingly separated from the fluid by a pair of O-rings 192 and 194. Nozzle 180 is cantileveredly supported from its inlet and projects outwardly into reservoir 182 so that the outer periphery of the nozzle is immersed within the fluid.

Flow meter 170 is useful in situations where the density of the fluid measured is known. There is no need, therefore, to weigh a given volume and the device can be simplified greatly, both mechanically and electrically. The electrical circuit used to determine flow would be similar to that shown in FIG. 7, however, the density bridge and related circuitry would be eliminated.

Fourth Alternative Embodiment

Figure 25:
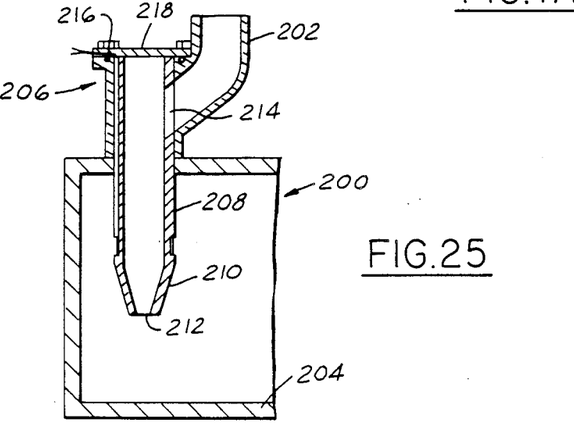
FIG. 25 is an enlarged cross-sectional elevation of an alternative embodiment of the invention employing a removal nozzle.

FIG. 25 illustrates yet another embodiment of the present invention having a removable nozzle. A flow meter 200 is shown in an enlarged cross-sectional side elevation corresponding to FIG. 20 of the first embodiment. Fluid inlet tube 202 attaches to reservoir 204. Inlet tube 202 is provided with an elbow region 206 which has an opening for receiving a nozzle assembly 208 telescopically within tube 202. The nozzle assembly is provided with a free nozzle end 210 extending into the interior of reservoir 204. Nozzle assembly 208 includes a generally tubular nozzle having a restrictive orifice 212 at free end 210 providing a nozzle outlet and a radial opening 214 communicating with inlet tube 202 at the opposite fixed end of the nozzle. Preferably as shown the fixed end of the nozzle is provided with an enlarged mounting flange 218 to facilitate the removable installation of the nozzle assembly to the elbow region 206 of the inlet tube. Electrical conductors extend from the strain gages which are installed adjacent the nozzle free end to the nozzle assembly fixed end as shown. O-ring 216 is provided between mounting flange 218 and the inlet tube elbow region 206 in order to provide a leak tight seal. Appropriate fasteners such as bolts or the likes are utilized for removably fixing the nozzle assembly to the tube elbow so that nozzles can be easily changed to suit various fluid flow rates.

Method

Using flow meters described above, a method of measuring flow can be described herein. The first step of the method is to provide a conduit having an input, an output, and a central region for fluid flow therebetween.

The second step of the method is to provide a nozzle having an inlet, a restricted outlet, and a thin-walled throughput region therebetween. The inlet should sealingly cooperate with the conduit. Additionally, the throughput region and restricted outlet should project into the conduit central region to allow fluid in the conduit to completely surround the nozzle therein. Finally, the throughput region should be constructed so that it will elastically deform circumaxially and longitudinally proportional to fluid flow.

The third step of the method is to direct fluid flow through the conduit and nozzle. The fourth step of the method is to measure the elastic deformation of the throughput region caused by momentum flux and pressure changes in the fluid which generate a pressure deformation signal in the nozzle proportional to fluid flow therein.

The fifth step of the method is to generate a fluid density signal either by inputting such signal directly or by weighing the fluid and calculating fluid density therefrom. The final step of the method is to process said pressure and fluid density signals to calculate fluid flow through the conduit.

The invention may further calculate fluid mass flow and fluid density. Additionally, the method may include a step for measuring temperature and for correcting flow measurements for temperature variation.

It is understood, of course, that while the form of the invention herein shown and described constitutes a preferred embodiment of the invention, it is not intended to illustrate all possible forms thereof. It will also be understood that the words used are words of description rather than limitation, and that various changes could be made without departing from the spirit and scope of the invention as disclosed.

What is claimed is:

1. A meter to measure fluid flow, comprising:
   a conduit having an input, an output and a central region for fluid flow therebetween;
   a nozzle having an inlet, a restricted outlet and a thin walled throughput region therebetween, said inlet sealingly cooperating with said conduit, said throughput region and said restricted outlet projecting into said central region, thereby allowing fluid in the central region to surround the nozzle therein, and wherein said throughput region elastically deforms circumaxially and longitudinally proportional to fluid flow; and sensor means for measuring the elastic deformation of said throughput region caused by fluid flow and for providing a pressure deformation signal from which fluid flow may be determined.

2. The invention of claim 1 further comprising:

density means for providing a fluid density signal; and output means for processing said pressure deformation and density signals and for providing a fluid flow output.

3. The invention of claim 2 further comprising support means for supporting said conduit input and output with said central region freely suspended therebetween.

4. The invention of claim 3 wherein said density means further comprises weighing means for measuring the elastic deformation of the conduit central region resulting from the weight of the fluid suspended therein and for providing a fluid density signal from which fluid flow may be determined.

5. The invention of claim 4 wherein said output means further comprises processing said fluid density signal and providing a fluid mass flow output.

6. The invention of claim 5 wherein said output means further comprises means for averaging said pressure deformation signal and for providing an average fluid flow over a time interval when fluid flow is variable.

7. The invention of claim 5 further comprising temperature means for measuring the temperature of said conduit central region and providing a temperature signal which said output means further processes to correct said pressure deformation and fluid density signals for apparent elastic deformation due only to temperature changes.

8. The invention of claim 5 further comprising gravity means for providing a gravitational force signal which said output means further processes to correct said fluid mass flow output for gravitational force variations.

9. The invention of claim 8 wherein said gravity means further comprises a gravitational force sensor.

10. The invention of claim 8 wherein said gravity means further comprises means for inputting a gravitational force constant.

11. The invention of claim 4 wherein said weighing means further comprises at least one strain gage affixed to said conduit central region wall.

12. The invention of claim 2 wherein said sensor means further comprises a plurality of strain gages affixed to said throughput region wall.

13. The invention of claim 2 wherein said nozzle is further provided with a tapered transition zone to enable fluid to flow therethrough with reduced energy loss.

14. The invention of claim 2 wherein said conduit input and output are generally aligned along an axis, and said conduit central region forms a loop extending outwardly from said axis.

15. The invention of claim 14 wherein the portion of said conduit central region containing said nozzle has a cross-sectional area greater than the conduit inlet or outlet.

16. The invention of claim 1 further comprising means for removably attaching said nozzle to said conduit to allow nozzle selection to meet various flow and fluid characteristics.

17. The invention of claim 16 wherein said removably attached nozzle is provided with a ceramic throughput region and with semiconductor gages having a thermal coefficient of expansion similar to that of the ceramic used, said gages being bonded to said ceramic throughput region to measure the elastic deformation of said throughput region in high temperature or corrosive applications.

18. The invention of claim 16 wherein said removably attached nozzle is provided with a plurality of strain gages attached to said throughput region wall to measure the elastic deformation of said throughput region wall, and wherein said nozzle is further provided with means for protecting said strain gages from fluid contact.

19. A method for measuring fluid flow, comprising:

providing a conduit having an input, an output and a central region for fluid flow therebetween;

providing a nozzle having an inlet, a restricted outlet and a thin-walled throughput region therebetween, said inlet sealingly cooperating with said conduit, said throughput region and restricted outlet projecting into said conduit central region to allow fluid in the conduit to surround said nozzle therein, and wherein said throughput region elastically deforms circumaxially and longitudinally proportional to fluid flow;

directing the flow of the fluid to be measured through said conduit and nozzle;

measuring the elastic deformation of said throughput region and generating a pressure deformation signal proportional to fluid flow therefrom;

generating a fluid density signal; and processing said pressure and fluid density signals to calculate fluid flow through said conduit.

20. The method of claim 19, further comprising supporting said conduit input and output with said central region freely suspended therebetween.

21. The method of claim 20 further comprising measuring the elastic deformation of the central region resulting from the weight of the fluid contained therein and providing a fluid density signal from which fluid flow may be calculated.

22. The method of claim 21 wherein said processing further calculates fluid density.

23. The method of claim 19 wherein said processing further calculates fluid mass flow output.

24. The method of claim 19 further comprising measuring the temperature of said conduit and providing a temperature signal.

25. The method of claim 24 wherein said processing further includes processing said temperature signal to compensate for errors in elastic deformation measurement caused by temperature alone.

26. The method of claim 19 wherein said processing further comprises averaging said pressure deformation signal and calculating an average fluid flow when fluid pressure is variable.

27. The invention of claim 1 wherein said nozzle is constructed of a ceramic material and wherein said gages are constructed of a semiconductor with thermal coefficient of expansion similar to that of the ceramic material used and bonded to said ceramic material, said nozzle for use in high temperature or corrosive applications.

* * * * *

UNITED STATES PATENT AND TRADEMARK OFFICE
CERTIFICATE OF CORRECTION

PATENT NO. : 4,986,135          Page 1 of 6

DATED : January 22, 1991

INVENTOR(S) : George Corser, et al.

It is certified that error appears in the above-identified patent and that said Letters Patent is hereby corrected as shown below:

Column 6, Line 64
"$Ff2+\Sigma QV_1-\tfrac{1}{2}QV_2$" should be --$F_{f2}+pQV_1-pQV_2$--.

Column 7, Line 4
"$\tfrac{1}{2}(v_1^2/2)=P_2+\tfrac{1}{2}(v_2^2/2)$" should be --$p(V_1^2/2)=P_2+p(V_2^2/2)$--.

Column 7, Line 8
"$\tfrac{1}{2}/2$" should be --$p/2$--.

Column 7, Line 24
"$(a_{f1}-A_{f2})$" should be --$(A_{f1}-A_{f2})$--.

Column 7, Line 43
"$F_x=F_2$" should be --$F_x-F_2$--.

Column 7, Line 61
"$[(-A_{f1}/2)(1/A^2_{f2})+(1/A_{f1}-1/A_{f2}(]pQ^2$" should be --$[(-A_{f1}/2)(1/A^2_{f1}-1/A^2_{f2})+(1/A_{f1}-1/A_{f2})]pQ^2$--.

UNITED STATES PATENT AND TRADEMARK OFFICE
CERTIFICATE OF CORRECTION

PATENT NO. : 4,986,135

DATED : January 22, 1991

INVENTOR(S) : George Corser, et al.

It is certified that error appears in the above-identified patent and that said Letters Patent is hereby corrected as shown below:

Column 7, Line 63
"$A_nA_{s1}$" should be --$A_n/A_{s1}$--.

Column 6, Line 29
Page 2, Lines 1-2), delete "static" and replace with --statics--.

Column 6, Line 41
"$M_1=pQv_1$" should be --$M_1=pQV_1$--.

Column 6, Line 44
after "section" delete "1-13 1" and insert --1-1--.

Column 6, Line 46
after "section" delete "1-13 1" and insert --1-1--.

Column 6, Line 48
after "section delete "1-13 1" and insert --1-1--.

Column 6, Line 51
after "sections" delete "1-13 1" and insert --1-1--.

Column 6, Line 52
after "section" delete "1-13 1" and insert --1-1--.

UNITED STATES PATENT AND TRADEMARK OFFICE
CERTIFICATE OF CORRECTION

PATENT NO. : 4,986,135        Page 3 of 6

DATED : January 22, 1991

INVENTOR(S) : George Corser, et al.

It is certified that error appears in the above-identified patent and that said Letters Patent is hereby corrected as shown below:

Column 6, Line 56
after "section" delete "1-13 1" and insert
--1-1--.

Column 6, Line 63
"$\frac{1}{2}QV_1+\frac{1}{2}QV_2$" should be --$pQV_1+pQV_2$--.

Column 6, Line 67
"$\frac{1}{2}QV_1-\frac{1}{2}QV_2$" should be --$pQV_1-pQV_2$--.

Column 7, Line 27
after "section" delete "1-13 1" and insert
--1-1--.

Column 7, Line 29
after "sections" delete "1-13 1" and insert
--1-1--.

Column 7, Line 33
"1-13 1" should be --1-1--.

Column 7, Line 35
after "section" delete "1-13 1" and insert
--1-1--.

Column 7, Line 57
delete "$p1_x A_{s1}$" and insert --$\sigma_{1x}A_{s1}$--.

UNITED STATES PATENT AND TRADEMARK OFFICE
CERTIFICATE OF CORRECTION

PATENT NO. : 4,986,135

DATED : January 22, 1991

INVENTOR(S) : George Corser, et al.

It is certified that error appears in the above-identified patent and that said Letters Patent is hereby corrected as shown below:

Column 7, Line 61
"$\sigma_{x1}A_{s1}=[(-A_{f1}/2)(1/A^2_{f2})+(1/A_{f1}-1/A_{f2}(]pQ^2$" should be --$\sigma_{x1}A_{s1}=[(-A_{f1}/2)(1/A^2_{f1}-1/A^2_{f2})$--.

Column 7, Lines 64 & 65
14 & 15), "$\sigma_{x1}A_{s1}=[(-A_{f1}/2)(1/A_{f1}^2-1/A_{f2}^2)+(1/A_{f1}-1/A_{f2})]pA^2$ Eq. 12" should be --$\sigma_{1x}=[(-D_1/8T_1)(1/A_{f1}^2-1/A_{f2}^2)+(1/A_{s1})(1/A_{f1}-1/A_{f2})]pQ^2$ Eq. 13a--.

Column 8, Line 10
"$\sigma_{1y}=P_1D_1/2T_1-P_2D_1/2t_1$" should be --$\sigma_{1y}=P_1D_1/2T_1-P_2D_1/2T_1$--.

Column 8, Line 19
"$\sigma_{16}$--$K_BpQ^2$" should be --$\sigma_{1y}=-K_BpQ^2$--.

Column 8, Line 27
"$\epsilon_{1x}=(1/E)(\sigma_{1x}-\frac{1}{4}\sigma_{1y})$" should be --$\epsilon_{1x}=(1/E)(\sigma_{1x}-\mu\sigma_{1y})$--.

Column 8, Line 29
"$\epsilon_{1y}=(1/E)(\sigma_{1y}-\frac{1}{4}\sigma_{1x})$" should be --$\epsilon_{1y}=(1/E)(\sigma_{1y}-\mu\sigma_{1x})$--.

Column 8, Line 6
"$+(1/_{s1})$" should be --$+(1/A_{s1})$--.

UNITED STATES PATENT AND TRADEMARK OFFICE
CERTIFICATE OF CORRECTION

PATENT NO. : 4,986,135

DATED : January 22, 1991

INVENTOR(S) : George Corser, et al.

It is certified that error appears in the above-identified patent and that said Letters Patent is hereby corrected as shown below:

Column 8, Line 38
"$\mu$Poisson's ratio" should be --$\mu$=Poisson's ratio--.

Column 8, Line 34
after "section" delete "1-13 1" and insert --1-1--.

Column 8, Line 36
after "section" delete "1-13 1" and insert --1-1--.

Column 8, Line 55
"$B.O.=2[(1+\mu)/E][K_A+K_B](pA^2)$" should be --$B.O.=2[(1+\mu)/E][K_A+K_B](pQ^2)$--.

UNITED STATES PATENT AND TRADEMARK OFFICE
CERTIFICATE OF CORRECTION

PATENT NO. : 4,986,135
DATED : January 22, 1991
INVENTOR(S) : George Corser, et al.

It is certified that error appears in the above-indentified patent and that said Letters Patent is hereby corrected as shown below:

Column 11, line 39, after "seat" insert --188--.

Signed and Sealed this

Twenty-fourth Day of August, 1993

*Attest:*

BRUCE LEHMAN

*Attesting Officer*     *Commissioner of Patents and Trademarks*